(12) United States Patent
Thill et al.

(10) Patent No.: US 9,965,298 B2
(45) Date of Patent: May 8, 2018

(54) DEVICE WITH TIME LIMITED USE AUTO START APPLICATION

(75) Inventors: Michel Thill, Meudon (FR); Joseph Leibenguth, Meudon (FR); Olivier Joffray, Meudon (FR)

(73) Assignee: Gemalto SA, Meudon (FR)

( * ) Notice: Subject to any disclaimer, the term of this patent is extended or adjusted under 35 U.S.C. 154(b) by 833 days.

(21) Appl. No.: 13/380,571

(22) PCT Filed: Jun. 23, 2010

(86) PCT No.: PCT/EP2010/058948
§ 371 (c)(1),
(2), (4) Date: Dec. 23, 2011

(87) PCT Pub. No.: WO2010/149722
PCT Pub. Date: Dec. 29, 2010

(65) Prior Publication Data
US 2012/0102237 A1    Apr. 26, 2012

(30) Foreign Application Priority Data

Jun. 24, 2009 (EP) .................................... 09300008

(51) Int. Cl.
   *G06F 9/445*    (2006.01)
   *G06Q 30/00*    (2012.01)
   *H04L 29/06*    (2006.01)

(52) U.S. Cl.
CPC ........... *G06F 9/445* (2013.01); *G06Q 30/018* (2013.01); *H04L 63/20* (2013.01)

(58) Field of Classification Search
CPC ......... G06F 21/77; G06F 9/445; H04L 63/20; G06Q 30/018

(Continued)

(56) References Cited

U.S. PATENT DOCUMENTS

| 4,494,114 A | 1/1985 | Kaish et al. |
| 8,364,203 B2 * | 1/2013 | Morel et al. ................... 455/558 |

(Continued)

FOREIGN PATENT DOCUMENTS

EP     1367487 A1    12/2003

OTHER PUBLICATIONS

PCT/EP2010/058948 International Search Report, dated Sep. 23, 2010, European Patent Office, P.B. 5818 Patentlaan 2 NL—2280 HV Rijswijk.

(Continued)

*Primary Examiner* — Ernest Unelus
(74) *Attorney, Agent, or Firm* — The Jansson Firm; Pehr B. Jansson

(57) ABSTRACT

(EN) The invention relates to a portable electronic device (SC, TK) comprising electric input means (VCC, GND, ANT) for receiving electric power from an external power supply. The portable electronic device (SC, TK) comprises an application, the application being set to be triggered when power is supplied to said electric input means (VCC, GND, ANT), and to not communicate with entities external to the portable electronic device (SC, TK), or to only notify such entities of an event. The application is further set to configure the portable electronic device (SC, TK), and to be successfully executable at most once. The invention also relate to a manufacturing equipment (M) for configuring a portable electronic device (SC, TK) and to a method for configuring a portable electronic device (SC, TK).

25 Claims, 2 Drawing Sheets

(58) Field of Classification Search
 USPC .................................................... 710/13, 10
 See application file for complete search history.

(56) References Cited

U.S. PATENT DOCUMENTS

| | | |
|---|---|---|
| 2002/0147989 A1 | 10/2002 | Kessler |
| 2003/0061604 A1 | 3/2003 | Elcock et al. |
| 2006/0036864 A1 | 2/2006 | Parulski et al. |
| 2006/0135138 A1* | 6/2006 | Lazaridis ...................... 455/417 |
| 2007/0203594 A1* | 8/2007 | Hovden ......................... 700/94 |
| 2012/0021719 A1* | 1/2012 | Kruis et al. .................. 455/406 |

OTHER PUBLICATIONS

PCT/EP2010/058948 Written Opinion of the International Searching Authority, dated Sep. 23, 2010, European Patent Office, P.B. 5818 Patentlaan 2 NL—2280 HV Rijswijk.

* cited by examiner

DEVICE WITH TIME LIMITED USE AUTO START APPLICATION

BACKGROUND

1. Field of the Invention

The invention relates to portable electronic devices, in particular smart cards. The invention also relates to methods and manufacturing equipments for configuring such devices.

2. Description of the Related Art

After being manufactured, portable electronic devices typically require configuration. Configuration is often done in the factory just after manufacturing.

Certain portable electronic devices are manufactured in huge quantities. For example, the applicant manufactured around 1419 millions portable electronic devices (mostly smart cards) in 2008 (almost 4 millions per day, every single day). It is therefore critical to be able to configure each device as quickly as possible. Indeed, the time taken to manufacture a portable electronic device has a direct impact on its cost, and therefore on the gross margin of the manufacturer.

In the field of smart cards, configuration is typically carried out during a well-known phase called "personalization". Indeed, smart cards are usually personal devices, and the configuration of a smart card typically comprises linking the smart card with a specific entity (e.g. individual), for example by recording its/his/her name in memory, storing a distinct password (e.g. PIN code) for each individual, and/or printing some information (e.g. photograph, name, company, etc.). Personalization is typically carried out by personalization machines. Each personalization machine is typically a fairly complex equipment, which is usually able to establish a communication with up to 32 or 64 smart cards in parallel, to carry out a number of security checks (e.g. mutual authentication with each smart card thanks to cryptographic algorithms), and then to exchange information with and send a number of orders to the smart card in order to configure it. Different smart cards may use different communication protocols, which makes the personalization machine even more complex.

The price of a personalization machine is usually very high (typically several hundreds of KEuros), so multiplying the number of personalization machine in order to increase manufacturing speed is of course possible but quite costly.

A personalization machine can be used to configure a smart card without any "personal" element (i.e. no element specific to an individual). For example, the configuration of the portable electronic device can comprise loading generic software (e.g. generic java applets) into the portable electronic device, or carrying out tests for validating the proper behavior of certain components of the portable electronic device, and possibly the identification of malfunctioning components so that the portable electronic device does not rely on them.

Nowadays, more and more portable electronic devices embed large flash memories. This is the case for SD or MMC cards, or for new generations of smart cards, such as certain SIM cards (smart cards used in mobile telephony).

There are mainly two types of flash memories:

Flash memories packaged without a controller ("stand alone packages"). Such flash memories are typically fully tested after they are packaged.

Flash memories sold at wafer level. This is in general the type of flash memories used for memory cards and new generation of smart cards embedding large memories. For such type of flash memories, the final package embeds the large flash memory and a controller for accessing this large flash memory. The current method for testing these flash memories is to have light tests at wafer level made by the flash memory supplier, and to have an extensive test done by the card manufacturer after or during packaging.

Tests for insuring that a flash memory is fully functional are typically very long. 3 to 6 minutes are usually needed for usual smart cards embedding large flash memories (several Gigabytes). Such durations are problematic in a smart card factory, where personalization shall be completed in a few seconds only (e.g. typically less than 13 seconds for GSM cards).

Specific and expensive test systems are available on the market for stand alone Flash packages, and for memory cards (SD, MMC, etc.). Such systems typically allow testing 256, 512 or sometimes even more packages at the same time. For smart cards embedding flash memories, a known solution consists in using a dedicated personalization machine for carrying out the flash memory tests. However, there are at least two important drawbacks. First, personalization machines are expensive, and second they have a poor parallelism: they can usually manage at most 32 to 64 smart cards in parallel.

When a portable electronic device is a security device, its configuration often comprises generating at least one asymmetric cryptography key pair. Asymmetric cryptography was introduced almost 40 years ago. In asymmetric cryptography, at least one key pair consisting of a private key and a public key is generated for a given entity. The private key is kept securely by the entity, while the public key is transmitted to any interested party willing to secure its relationship with the entity. The private key and the public key are linked together mathematically, but it is considered very difficult (in practice, impossible) to compute the private key from the public key. Any operation executed with one of the key can be "reversed" by the other key. Therefore, it is possible to put in place a digital signature mechanism, wherein the entity "encrypts" data to be signed (or rather a hash of such data) with its private key. Nobody but the entity can carry out such operation since only the entity possesses the private key. However, anybody can verify the signature by using the corresponding public key. Conversely, any person willing to encrypt confidential data for the entity can do so with the public key of the entity, knowing that only the entity (having the private key) will be able to decrypt it. It is also possible to use asymmetric cryptography for authentication: a third party willing to authenticate the entity can send a random number, the entity can return the random number signed with the private key, and the third party can verify the signature. Many different use cases exist. In practice asymmetric cryptography systems are quite sophisticated and comprise additional steps (use of certificates, sometimes use of time stamping, etc.). The private key is typically very sensitive and should be highly protected.

There are many asymmetric cryptography algorithms, e.g. El Gamal, RSA, elliptic curves, Diffie Hellman, etc. In all systems, it is typically quite complex and long to generate a key pair. One of the difficulties consists in picking a good random number (if the key pair is not based on sufficiently random numbers, third parties could be able to predict the key pair). But smart cards can now generate fairly good random numbers fairly quickly with hardware mechanisms.

In RSA (which is considered the most widespread asymmetric cryptography algorithm), a major difficulty consists in finding big prime numbers (this is very time consuming). In the case of RSA, it is currently believed that keys should have a length of at least 2048 bits in order to withstand possible attacks. Generating a 2048 bit RSA key pair typically takes 60 seconds or more on a smart card.

If a key pair is to be used for encryption, it is often considered good practice to keep a copy of it in a secure server, in case the smart card is destroyed, stolen or lost. Otherwise, all encrypted data would be irrecoverable, and this risk is usually higher than the risk of the server being attacked and the key pair being recovered by hackers. However, if the key is used for digital signature, it is usually considered that the key should not be backed up. There are at least two reasons. The first is the fact that even if the smart card is lost, stolen or destroyed, there is no real inconvenience for the user, who can simply revoke the previous key pair, obtain a new key pair, and sign future documents with his new private key. The second reason is the fact that a digital signature is supposed to reflect the consent of the user, therefore it should have an extremely high security, and it is often unacceptable to have a given key pair available in different places. With the advent of European directive 1999/93/EC on digital signatures, and similar legislations throughout the world, it is typically required that the key pair be "under the sole control of the signatory" in order for the digital signature to have the same legal value as a handwritten signature, and this is clearly not the case if the key is present both in the smart card of the user (which is under his sole control) and in a server which is clearly not under the control of the user (e.g. in some instances a disgruntled administrator of the server might be able to use some keys stored in the server).

Consequently, it is typically decided to generate encryption key pairs in high performance security devices (typically hardware security modules a.k.a HSM), and then to load them securely both into the smart card and into a "secure server". Sometimes this HSM method is used in factories for signature key pairs too. However, as soon as a signature key pair is not generated within the smart card, a suspicion can exist as to whether the generation of the key pair and its transmission to the smart card was really secure (even if the key pair is not supposed to be backed up in a server once generated and loaded into the card). Generating the key pairs in the smart card during production being very long, it can block the production lines in the factory and is only rarely implemented. Therefore, as an alternative, high security smart cards are often delivered without signature key pairs, and it is up to the user to initiate the key pair generation. For example, if the card is a SIM card, the user could send the order to generate the key pair from a cell phone in which the SIM card is inserted. Or if the smart card is a PKI card used to secure a personal computer, the order can be sent from the computer. However, since the operation is long, it can be confusing for the user, and there are risks of errors and possibly attacks. Chances that the smart card be powered down in the middle of the generation are much higher than in a factory where the process is normally under control.

Sometimes a key pair can have multiple purposes (e.g. signature and encryption). This is typically not recommended (because of conflicting security constraints), but if implemented anyway, a compromise needs to be found regarding the key pair generation (usually it is decided to back it up on a secure server).

Digital signatures deemed equivalent to handwritten signatures (e.g. qualified electronic signatures in Europe) are more and more requested, in particular for electronic ID cards, and it is desired to find a solution enabling a very secure and convenient way to generate signature key pairs without blocking factories. To ensure a signature is genuine and generated by the card holder only, the cryptographic keys used to compute it shall be kept very secret, i.e. the private portion of the key shall preferably never be disclosed to anyone, including to the card issuer (i.e. the government representative) and the card manufacturer. The private portion of the key should ideally be both generated and kept inside the smart card, never be disclosed outside the smart card even in encrypted form, and be lost if the smart card stops working.

A smart card compliant with ISO 7816-1 and ISO 7816-2 is connectable to a reader through a set of electric contacts named C1 to C8. These contacts include two electric contacts (contact C1 usually called VCC and contact C5 usually called GND) to provide the card with electric power, an "I/O" contact (for input and output of data with the reader) and a "clock" contact used to synchronize the communication between the card and the reader. It is known to have internal clocks in smart cards, so a smart card does not need to have a clock provided from outside in order to be able to execute software internally. The clock is mostly useful for synchronizing data exchanges. The electric contacts also include a "reset" contact to initiate the smart card boot procedure. A full process to startup a smartcard is described in the ISO 7816-3 standard. In theory (according to the ISO 7816 standard), providing power to the smart card is not sufficient to have its internal software starting. It is also required to have a clock signal on the "clock" contact, and a transition of the electrical level on the "reset" contact. To be more specific, an ISO 7816 smart card cannot a priori be expected to be able to boot with only VCC and GND. However in reality it has become possible to boot a smart card component by simply providing power on VCC and GND. This possibility was introduced recently, in particular with multiple IOs smart cards such as smart card embedding both the regular ISO contact interface and another interface: ISO 14443 contact-less interface, SWP (single wire protocol), etc. On such smart cards, the reset signal on the reset contact C2 can be interpreted differently, it no longer means booting the smart card chip and the smart card operating system, but simply resetting the ISO application.

A smart card typically communicates with the reader in which it is introduced by responding to reader requests (usually the requests are APDU commands standardized by ISO 7816, although other possibilities exist). That is the smart card is typically a slave which does not normally complete any operation if it is not required to do so by the reader (or most often by an entity sending orders to the smart card through the reader). The operation typically ends with the smart card answer (quite often a status word standardized by ISO 7816) returned to the reader when treatment is completed. Between the start and the end of the treatment, the smart card reader is supposed to continue providing power and a clock signal to the smart card. When the T=0 protocol (defined in ISO 7816-4) is used, the card may transmit, according to ISO 7816-3, a special byte (0x60) to the reader in order to avoid a time-out from the reader. The smart card can send this byte 0x60 in order to indicate that it needs more time to complete the treatment successfully. This is useful for abnormally long commands such as RSA key generation which would otherwise be aborted by the reader. In T=0, without this byte 0x60, the reader assumes that the application running in the smart card could not finish (something went wrong with the smart card, e.g. it crashed, or it became mute for security reasons, etc.).

It is known to launch auto tests and basic operations when a smart card is powered up.

Abandoned European patent application 02 703 770.4, filed by the same applicant, discloses a smart card in which as soon as power is applied, a mechanism starts generating random numbers and storing them in volatile memory (RAM). This mechanism is run each time the smart card is powered up, and does not affect the configuration of the smart card, but only its RAM (erased after the smart card is powered down). Configuring implies changing some information in non volatile memory. This patent application aimed at increasing the availability of random numbers, by generating random numbers in advance and making them available directly in RAM, in parallel with the normal processing of the smart card. It turned out that generating this kind of random numbers became quite fast and that the proposed solution was not so useful nowadays.

It is known to configure a device (e.g. personal computer) when it is first powered up. A software automatically launches the installation of an operating system (e.g. in Microsoft world the user may have the choice between different Windows versions, e.g. Windows XP and Vista). However such software requires communication with external entities. In particular the software displays information for the user on a screen, the user must input certain information on the keyboard and click certain buttons with the mouse. The software must also typically establish network connections for Windows activation and for looking for software updates, etc. The mere power is not sufficient for configuring the device.

As seen from the above explanations, a problem with state of the art portable electronic devices is that it is hard to configure them quickly and cheaply, especially when they require time demanding features such as asymmetric key generation or flash memory testing. It is an object of the invention to propose a portable electronic device which can be configured in a more efficient manner. It is also an object of the invention to propose a manufacturing equipment and a method for configuring portable electronic devices in a more efficient manner.

BRIEF DESCRIPTION OF THE DRAWINGS

The invention and its advantages will be explained more in details in the following specification referring to the appended drawings, in which.

DETAILED DESCRIPTION

Figure 1:
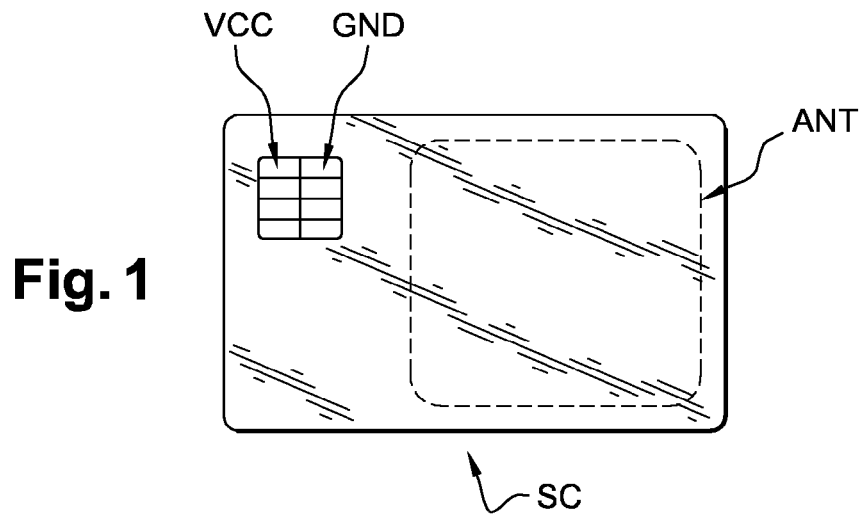
FIG. 1 represents a smart card SC according to a preferred embodiment of the invention, the smart card SC having an ISO 7816 module with contacts VCC (C1 on the top left of the module) and GND (C5, on the top right of the module), as well as an antenna ANT.
Figure 2:
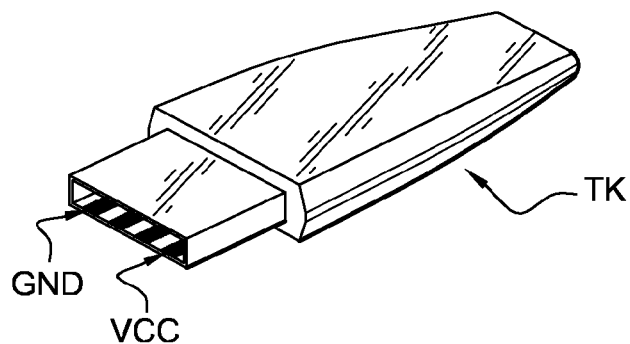
FIG. 2 represents a USB token TK according to a preferred embodiment of the invention, with the four USB contacts (GND on the left, then the two data contacts, and VCC on the right, which is often called VBUS)
Figure 3:
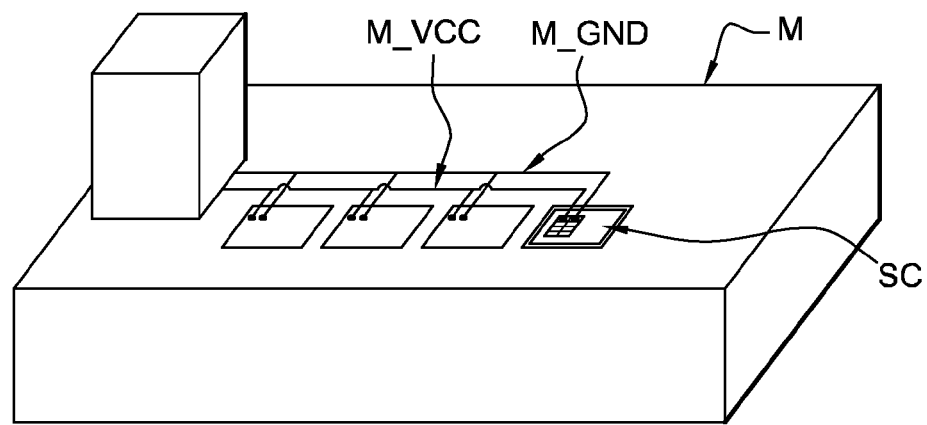
FIG. 3 represents a schematic view of a manufacturing equipment M according to a preferred embodiment of the invention, with a power supply designed to power a smart card SC, the lines M_VCC and M_GND of the electric output means being connected to the contacts VCC and GND of the smart card SC. This is a simplified view, with only 4 slots for smart cards represented, and only one smart card actually present, in reality the shape of the machine can obviously be very different, and there are much more smart cards in parallel.

A portable electronic device according to a first embodiment of the invention comprises electric input means for receiving electric power from an external power supply. The electric input means can be, for example, the electric contacts VCC and GND (such as ISO 7816-2 contacts C1 and C5) of a smart card SC, or the electric contacts VCC (sometimes called VBUS) and GND of a USB token TK. The electric input means can also be an antenna ANT of a smart card SC. According to the invention, supplying power through contact-less means can be advantageous as it is possible to put lots of portable electronic devices in the vicinity of the contact-less power supply, without having to deal with the establishment of a reliable electric contact, which typically (but not always as will be seen further) requires handling each portable electronic device individually, and typically requires mechanically positioning portable electronic devices with a great accuracy in order for the electric contact to be satisfactory.

A portable electronic device according to the invention further comprises an application having the following characteristics. The application is set to be triggered when power is supplied to said electric input means, i.e. it is a kind of auto-start application. In other words, the application does not have to be run following an explicit request from an external entity (such as a reader sending an APDU command) since it is automatically run when electric power is supplied. The application is also set to not communicate with entities external to the portable electronic device. In the context of the invention, not having to communicate with external entities is advantageous because it avoids the need for a complex machine (such as personalization machines) implementing a communication protocol able to interface with the portable electronic device.

A portable electronic device according to the invention is characterized in that the application is further set to configure the portable electronic device and to be successfully executable at most once. Therefore, once the portable electronic device has been configured, the application is no longer executed. In other words, the application is not a boot procedure which would be systematically executed, but really an application which is run only once, unless it fails completing the task it is designed for. It is also possible to prevent the application from being executed, for example the application might wait a few seconds before it starts, and the portable electronic device may comprise a command to "kill" the application before it runs (in case "manual" configuration is finally preferred to self-configuration). This few seconds waiting time gives the possibility to connect to the portable electronic device e.g. to a regular personalization head, and to quickly send the order to remove or deactivate the application, before the application is run.

According to a second embodiment of the invention, a portable electronic device comprises electric input means for receiving electric power from an external power supply, an application, set to be triggered when power is supplied to said electric input means, and notification means for notifying an external entity. The portable electronic device of this second embodiment is characterized in that the application is further set to configure the portable electronic device, to be successfully executable at most once, and to not communicate with entities external to the portable electronic device, except by triggering the notification means once it has successfully executed. It should be noted that this exception constitutes a very simple and only one way communication (from the portable electronic device to an external entity). The second embodiment is very similar to the first embodiment, except that it comprises the notification means, and consequently that the application has the ability to communicate with external entity (only in one direction, as it does not receive any data from external entities). Besides that, characteristics explained for the first embodiment apply equally in the second embodiment. In preferred embodiments, the notification means are very simple and consist for example in changing (either permanently or for a short time) the voltage on one or more contacts of the portable electronic device in case the portable electronic device has contacts, or sending a signal with the antenna if it has an antenna. For example, if the portable electronic device is an ISO 7816-2 compliant smart card, it is possible to simply change the state on any of C2, C3, C4, C6, C7 or C8. It is preferred to use the 10 pin (which is contact C7) since its use is compliant with role as defined by ISO 7816-2. However it is typically also possible to use any of the other contacts (C2, C3, C4, C6, and C8) or any combination of contacts C2, C3, C4, C6, C7 and C8. Indeed it is in general not important that pins C2, C3, C4, C6, and C8 have different roles according to the standard, because they are typically used in the context of the invention only in a factory, and afterwards they can be used according to the standard.

Unless explained otherwise, the improvements to portable electronic devices described further below apply to both first and second embodiments above.

In preferred embodiments, once the application has finished executing, it stops, and optionally the portable electronic device may wait for orders (which generally implies connecting the portable electronic device to a regular personalization head without interrupting the power supply), but either way as it does nothing unless requested, its power consumption is greatly reduced. In preferred embodiments, when stopping, the application puts the portable electronic device in stand-by mode for saving energy. This also has advantages described below for the manufacturing equipment.

In preferred embodiments, the portable electronic device comprises means to detect situations in which the application fails or is interrupted before completion, and to resume or restart the application next time power is supplied to electric input means. For example, the application may, once it has been successfully executed, record in non volatile memory (NVM) its successful completion, or burn a fuse. Then, next time power is supplied to the portable electronic device, the non volatile memory (or fuse, or any other similar means) can be checked, and if the success of the application is not recorded, then it means that the application failed, and it has to be rerun from start, or continued from where it stopped. For implementing the latter option, it is possible to record regularly the progression of the application in NVM (or burn a different fuse for each step of the configuration which is successfully executed, etc.). In case a problem occurs, the portable device can then find out during next power up that the first K steps have been completed, and that only the last N–K steps of the configuration procedure need to be executed. It should be noted that in situations in which the application fails or is interrupted before completion, the notification means do not have a chance to be triggered or at least to be fully completed.

In preferred embodiments, the portable electronic device comprises means to detect the successful execution of the application. Such means can be the same as the ones that trigger the notification means of the second embodiment. Once successful execution is detected (e.g. the end of the application is reached, and/or all relevant status flags are properly set), the application may record in a non volatile memory the fact that it completed successfully, and next time the portable electronic device is powered up, it can check the status in non volatile memory (or check a fuse, or check a RAM register maintained by a battery or capacitor, etc.). If the status is positive, the portable electronic device preferably removes the application from its memory since it was already successfully executed. This is applicable to situations where the application is stored in a rewritable memory (such as EEPROM, flash, RAM with battery preventing RAM erasure when power supply is interrupted, etc.). This removal is advantageous, since memory can then be reused for other purposes, while memory is often a limited resource on portable electronic devices (especially on devices such as smart cards). However, if the application was stored in ROM, then it is not possible to remove it from memory. In this case, a flag or any other similar mechanism as described above (fuse, information recorded in non volatile memory, etc.) can indicate that the application was already executed successfully and shall not be run any more when the portable electronic device is powered up. In a variant, the application self removes itself, i.e. as soon as it has finished configuring the device, it auto-deletes (preferably with an anti-tearing mechanism insuring that for example if the power supply is interrupted in the middle of the deletion, the deletion process is finished next time the power supply is back). In another variant, the portable electronic device has a command for removing the application from memory (such command could be called, for example, by a factory machine such as a personalization machine, to which the portable electronic device would be connected after the portable electronic self-configured itself using solely the power supply). With such command, the removal is no longer automatic but has to be explicitly requested by sending the command.

It is possible to load the application in the portable electronic device (for example via a personalization machine), then to let the application execute by simply providing power to the portable electronic device, and then to carry out different personalization steps including loading of another application into the portable electronic device (e.g. still with a personalization machine), and again let this other application execute by only providing electric power to the electronic device, and to repeat those steps as many times as needed. This is a bit like transferring part of the intelligence of the manufacturing equipment used to configure the portable electronic device into the portable electronic device itself, so that all tasks which can be completed in autonomy by the portable electronic device do not waste manufacturing time.

The portable electronic device according to the invention can be manufactured in many different form factors. One common characteristic of the form factors is that the portable electronic device is relatively small and light (could be carried in a pocket). Non limitative examples of portable electronic device include smart cards (e.g. bank cards, SIM cards, health care cards, PKI badges, etc.), memory cards (e.g. MMC, SD, etc.), USB tokens (in which case the notification means can use either the D+ or the D− pins, or both pins), NFC devices, electronic passports (or other electronic documents provided by governments such as ID cards, voter cards, etc.), or electronic driver's licenses. Portable electronic device according to the invention typically don't have an internal source of energy (battery etc.). However in a variant of the invention it is possible to have a small battery or a capacitor embedded in the portable device, e.g. to keep a secure time and date reference between two connections of the portable electronic device.

When manufacturing smart cards and also certain portable electronic devices, one of the manufacturing steps comprises putting smart card chips on a printed circuit or metallic leadframe in stripes or reels (usually in 35 mm wide format). Smart card chips themselves are also portable electronic devices according to the invention (which are later embedded in a bigger portable electronic device: the smart card). When the smart card chips are on a printed circuit or metallic leadframe in stripes or reels, it is possible to provide power to many smart card chips at the same time through shared electric contacts. This is explained more in details below.

According to a preferred embodiment, the portable electronic device comprises non volatile memory. Configuring the portable electronic device may comprise generating an asymmetric cryptography key pair (or several asymmetric key pairs) and storing at least the private key of each key pair in the non volatile memory. The public key of each key pair can be stored as well, if needed, for later retrieval. In some algorithms storing the public key may be superfluous. For example, with RSA, it is common practice to use a constant exponent for the public key (e.g. 0x10001 is a very common value for RSA 1024), and the modulus of the public key is the same as the one of the private key. In this example, the public key consisting of a constant exponent (known in advance) and of a modulus which is already stored or at least computable (in case CRT is used) from the private key, it may be advisable to not store the public key in order to save some memory (the portable electronic device can be programmed to compute and output the public key corresponding to a given private key). However, in the above example, if the system at stake does not impose a specific public exponent, then storing the public key is normally mandatory.

The asymmetric private key (or the whole key pair) generated as described above can be stored for a specific use (e.g. it may be the authentication key of a driver supposed to use the portable electronic device as his driver's license). Alternatively, the private key (or the whole key pair) can be stored in a temporary but non volatile memory. Then, when at a later stage the portable electronic device needs to generate an asymmetric key pair, the key generation API of the portable electronic device can, instead of generating a new key pair, immediately retrieve the previously generated key pair. This is advantageous in particular when it is known that some key pairs will be needed, but it is not known for what purpose (e.g. signing contracts up to 1 M$, signing contracts above 1 M$, signing e-mails, etc.), where they will have to be stored in the portable electronic device, etc. In high security public key infrastructures (PKI), it is often recommended to have different keys depending on the usage of the key.

According to a preferred embodiment, the portable electronic device comprises a flash memory, and configuring the portable device comprises testing the flash memory, i.e. in particular marking the good and back memory blocks. This is advantageous since it avoids a complex machine for managing the test (the test is carried out automatically within the portable electronic device). In preferred embodiments, the flash testing is carried out in three steps.

In a first step the application (for testing the flash memory) is loaded into the portable security device (e.g. using a personalization machine).

In a second step, the portable electronic device is connected to a manufacturing equipment providing a power supply, and the application automatically starts running and testing the flash. The application may record in NVM the results of the flash memory tests (typically in a log file), and the fact that the test was executed.

In a third step, the portable electronic device is reconnected with the first machine (typically a personalization machine). The portable electronic device is powered up, but the application for testing the flash does not start (since the portable electronic device identifies in NVM that it was already run). The first machine can check the flash test results recorded in NVM, and if the results are too bad, the portable electronic device may be identified as a faulty one, and be disposed of. Otherwise, some standard personalization process can continue and fill the parts of the flash memory identified as operational, and possibly other NVM, with miscellaneous information.

Figure 4:
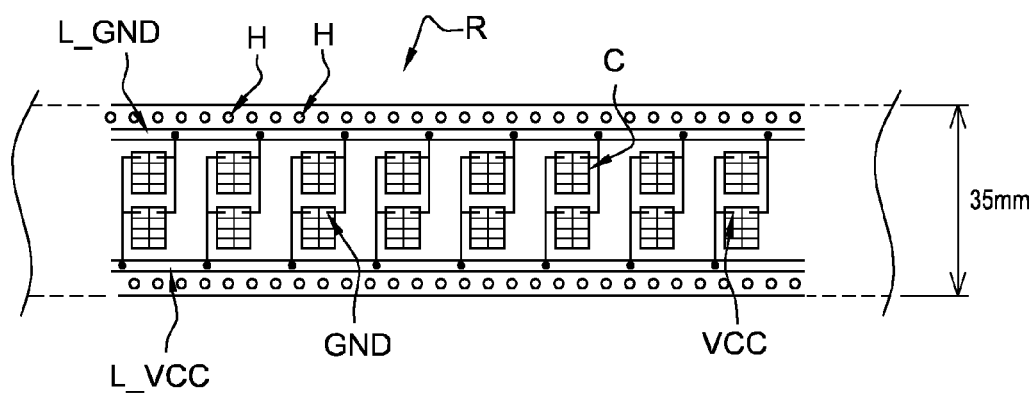
FIG. 4 represents a portion of a reel R containing smart card modules according to a possible embodiment of the invention (each smart card module contains a smart card chip C).
Figure 5:
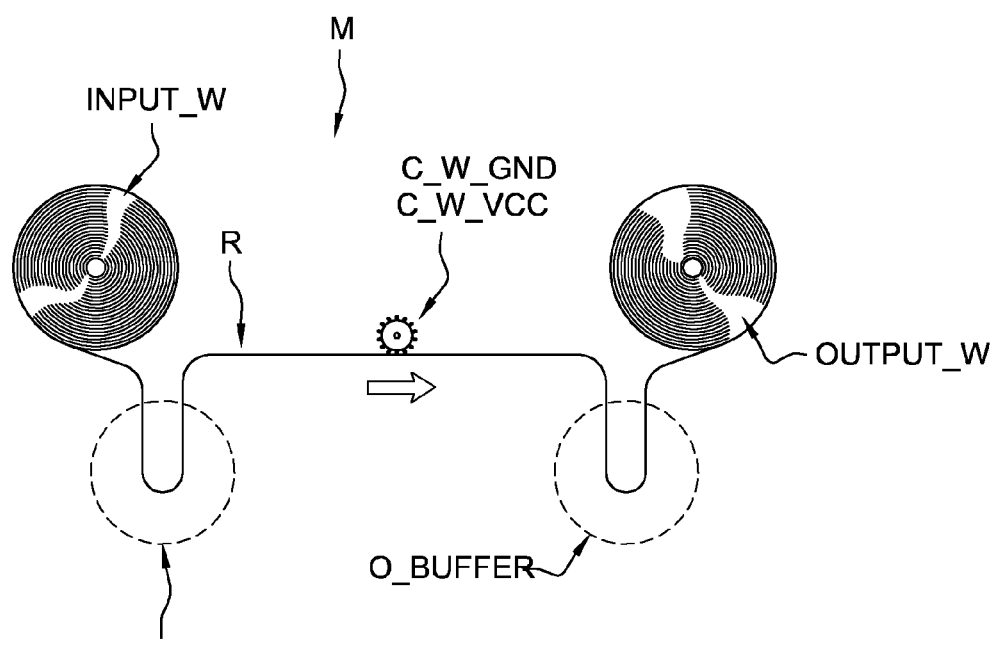
FIG. 5 is a sketch representing parts of a manufacturing equipment M according to a possible embodiment of the invention.

The invention also relates to a manufacturing equipment. A first embodiment of the manufacturing equipment M is set for configuring a set of portable electronic devices as described above. For example such manufacturing equipment can comprise a personalization machine. The manufacturing equipment has means to communicate with the portable electronic devices in order to configure them, for example special heads having all necessary contacts such as the 8 contacts C1 to C8 specified by ISO 7816-2 as well as processors implementing the required communication protocols. The manufacturing equipment further comprises (in addition to the known elements such as personalization heads) electric output means designed to supply electric power to electric input means of a portable electronic device. The electric output means can be simply two wires M_VCC and M_GND, M_VCC being connected to a 5 volts power supply (or any voltage appropriate for the portable electronic device concerned), and M_GND being connected to the other pin of the power supply (typically the ground). The two wires can end with electric contacts appropriate for establishing a reliable connection with the electric input means of the portable electronic device (e.g. contacts C1 and C5 of an ISO 7816-2 compliant smart card module). The electric output means can provide power to a single portable electronic device (e.g. a smart card connected to the electric output means through the electric contacts C1 and C5 of the smart card module, or a dongle connected to a USB port without D+ and D− wires but only Vbus and ground), or to several portable electronic modules in parallel, for example the electric output means can provide power to a stripe or reel comprising several chips (such as 35 mm stripes or 35 mm reels mentioned earlier). Electric power can be provided to such smart card chips (on the reel or stripe) through a roller drive (made of conductive material) used to move the reel or stripe, or through test pins (also called test needles) establishing contact with a VCC line and a GND line on the reel or stripe when it is stationary (it is preferred to establish a single contact with several pins/needles, e.g. three pins/needles, in order to have a much higher guarantee that there will be a reliable electric contact, even in case some of the pins/needles are damaged by oxidation, or in case some pollution alters the electric contact of some pins/needles). A conductive roller drive (in the form of a wheel) is usually advantageous (compared to pins/needles) since power supply can be maintained while the reel or stripe is moving. A preferred embodiment with a reel of smart card modules is shown on FIGS. 4 and 5. FIG. 4 shows a section of the reel R. The reel contains plenty of smart card chips C included in modules (on FIG. 4, two rows of smart card modules fit in the 35 mm width of the reel). Of course other types of chips could be used (not necessarily smart card chips). The reel of chips has conductive lines L_VCC and L_GND connected to the VCC and GND contacts of the smart card chips. The reel has series of holes H on both sides, like on a film reel, in order to be movable by a set of wheels (C_W_GND and C_W_VCC shown on FIG. 5, but only one of the wheels is visible since the other is hidden behind). FIG. 5 is a sketch representing parts of the manufacturing equipment M, configured to manage smart card modules in "reel to reel" mode. Each smart card module embeds a smart card chip C. A first wheel INPUT_W containing a reel R supplies the manufacturing equipment M with smart card chips C located on the reel R. There is preferably an input buffer I_BUFFER in order to not generate any strain on the reel R. The input buffer I_BUFFER may consist in an extra portion of the reel R left at the entry of the machine (this extra portion is U shaped due to gravity) so that when the manufacturing equipment M pulls on the reel R through the conductive wheels C_W_GND and C_W_VCC, it does not pull the whole (heavy) input wheel INPUT_W, but only the buffer. The wheel INPUT_W can be rotated as well (e.g. by a dedicated electric motor) in order to maintain a sufficient length in the buffer. But it is better and safer to keep an input buffer, even if attempts are made to synchronize as accurately as possible the rotation of the input wheel INPUT_W with rotation of the wheels C_W_GND and C_W_VCC. After the buffer, the reel R is guided on a preferably flat area. Quite often the connections of the chips C are initially shortcut (due to previous manufacturing steps). The connections can be disconnected at the entry of the machine M (for example by punching a hole in the connection, or with a laser), except the connections needed for power supply VCC and GND which need to remain connected. The connections VCC and GND of the chips C can be connected respectively to lines L_VCC and L_GND. The lines L_VCC and L_GND are preferably on each side of the reel, contiguous to the holes H, so that they are in electric contact with conductive wheels C_W_VCC and C_W_GND used to move the reel R. The conductive wheels C_W_GND and C_W_VCC are connected to the power supply supplying electricity to the chips C. The manufacturing equipment M preferably punches (or otherwise interrupts the electric contact of) the line L_VCC and/or of the line L_GND (preferably both lines) every certain number of chips, e.g. every 100 chips, so that no more than 100 chips (or any number deemed appropriate) are powered at the same time by the conductive wheels C_W_GND and C_W_VCC. At the output of the manufacturing equipment M there is preferably an output buffer O_BUFFER, similar to the input buffer I_BUFFER, for avoiding any strain with at the output of the manufacturing equipment M. The output of the manufacturing equipment can be for example an output wheel OUTPUT_W on which the reel is rolled again. The output can also be a component managing a subsequent manufacturing step (for example test or personalization of the chips), which may occasion variable accelerations on the portion of reel R (or strip) which it is manipulating.

It is very advantageous in a manufacturing environment to operate on the chips themselves once they are on the reel or on the strip, before they are embedded in a "final" portable electronic device such as a smart card. Indeed, it is easier to manage strips or reels containing thousands of chips than to individually manage separate physical entities (such as smart cards). It is also a lot more efficient in terms space optimization (which is a critical factor in a plant), i.e. the density of portable electronic devices managed per square meter is much higher with such reels/strips. In a later manufacturing step, the smart card modules are removed from the reel R and embedded in a smart card body (in a known manner).

In a possible embodiment, the electric output means are stationary with respect to the manufacturing equipment, and the portable electronic devices (e.g. smart cards) flow in the manufacturing equipment (in a translation movement) with continuous contact with electric output means. In such case, there is a risk of providing power on undesired contacts, which could create shortcuts or other electric/electronic problems. For example, if the portable electronic devices are smart cards moving laterally with respect to the electric output means, there could be a risk of providing power on smart card contacts C2 and C6, C3 and C7, or C4 and C8, instead of smart card contacts C1 and C5. The manufacturing equipment is therefore preferably configured to identify the positions of the portable electronic device for which the electric output means have to be activated (e.g. optical detection of a smart card, or mechanical triggering of a switch when the edge of the smart card reaches the switch), and when not in such position, the electric output means are deactivated. Alternatively, or additionally, the electric output means can comprise an antenna connected to a power supply. In this case, it is possible to have an antenna of the manufacturing equipment supplying power to many portable electronic contact-less devices. Using an antenna instead of electric contacts simplifies the manufacturing equipment since there is no need to position each of the portable electronic devices accurately for establishing an electric contact. The manufacturing equipment can comprise both contact and contact-less electric output means.

The manufacturing equipment comprises determination means for determining, without communicating with the portable electronic device which is only powered through electric output means (no other connection or communication is needed with the manufacturing equipment), that the execution of the application of the portable electronic device is finished. This is advantageous, since there is no need for embedding additional means for communicating with portable electronic devices in the manufacturing equipment, which makes the manufacturing equipment much simpler. Indeed there is a limit to the number of portable electronic equipments with which the manufacturing equipments can communicate without radical architecture change, while it is much easier to add extra power supply cables or antennas. Of course, detecting that the application is finished does not mean that the application successfully completed its assigned tasks, but as seen earlier, successful completion can be checked in a subsequent step.

A second embodiment of the manufacturing equipment is as follows. The manufacturing equipment is set to configure a set of portable electronic devices according to the second embodiment the portable electronic device or to the improvements thereof. For example, it can comprise a regular personalization machine. It further comprises electric output means designed to supply electric power to electric input means of portable electronic devices. The manufacturing equipment M comprises determination means for determining, by receiving a notification from the notification means of the portable electronic devices powered through said electric output means that the execution of the application of said portable electronic device is finished. This second embodiment of the manufacturing equipment is very similar to the first embodiment, except that it has additional (but very simple) means to receive the notification. Such means can consist of wired electronic (no need for a processor, as there is not real protocol). When/if the notification is received, the manufacturing equipment knows not only that the application is finished, but also that it completed successfully. In preferred embodiments, in order to deal with situations where no notification is received (e.g. faulty portable electronic device), the detection means can comprise further features described below. Unless explained otherwise, the improvements below apply to both the first and second embodiment of the manufacturing equipment, and the details of the first embodiment described above are transposable to the second embodiment.

In preferred embodiments, the determination means comprise means for measuring the electric power consumed by each portable electronic device. This is particularly advantageous for manufacturing equipment operating in contact mode, since each portable electronic device can often be monitored individually (except in certain variants of the first embodiment where electric output means provide power to multiple portable electronic devices). When the application of the portable electronic device has finished executing, the portable electronic device typically does not do anything more and consumes less power. In preferred embodiments, when the application of the portable electronic device has finished executing, the portable electronic device preferably enters a stand by mode, which is even more easily detectable since the ratio active power/stand by power can be as big as 100 or even more. The determination means according to this embodiment can detect which of the portable electronic devices have a low consumption, and accordingly have such portable electronic devices transferred to the next manufacturing step, and replaced by other portable electronic devices to be self-configured. In case the portable electronic device has notified its successful completion (second embodiment) but the consumption remains high, the portable electronic device may generally be considered faulty (in this case the notification mechanism must have failed).

In a simplified variant particularly relevant for the first embodiment, all electric output means are connected to a single determination module, which measures the global consumption, and indicates that normally all portable electronic devices have been configured when the overall power consumption drops below a given threshold. This avoids having to manage each portable electronic device individually (in the second embodiment, for this embodiment to be interesting it is recommended to not manage all notifications individually but to carry out a logical AND on all of them in order to manage a single global notification). But this also means that the portable electronic device which is the longest to self-configure will determine the time needed to self-configure the whole batch. This also typically requires all portable electronic devices to be the same or at least the overall power consumption of all portable electronic devices to be sufficiently predictable. This also requires means to inform the determination means of the number of portable electronic devices which are being supplied with electric power. Having single determination means may introduce risks of errors if there are too many portable electronic devices powered in parallel (e.g. if there are 1000 portable devices, of which 999 are in stand-by mode, it may be difficult to notice that the last one is not yet in stand-by mode). So it may be preferred to use common determination means for at most 100 portable electronic devices (or any number deemed appropriate based on the specific characteristics of the portable electronic devices concerned), i.e. 10 common determination means for a manufacturing equipment able to supply power to 1000 portable electronic devices in parallel. In addition, when the set of portable electronic devices in the manufacturing equipment is composed of totally different devices which electric consumption characteristics are not known in advance, there may be difficulties in defining the threshold below which it is sure that all of them have finished executing their application, and therefore there may be a problem of predictability. So in preferred embodiments, the manufacturing equipment is fed with batches of identical portable electronic devices (which is the case anyway most of the time for other reasons). There is also potentially an issue with this embodiment, linked to the fact that if one of the portable electronic tokens fails (continues to consume lots of power or does not send the notification), then it can block the whole batch. This issue is addressed in a following improvement.

In an alternative embodiment, the manufacturing equipment has determination means comprising a timer measuring the longest possible time for the execution of the application. Therefore, once this time has elapsed, it can be inferred that all portable electronic devices have been configured (some may have failed, but this can be detected in a subsequent manufacturing step for example). Using this maximum time is very simple to implement, and can be very appropriate for contact-less portable electronic devices, in which accurately measuring the power really consumed by the portable electronic devices can be more difficult.

In preferred embodiments, the two techniques described above (as well as other techniques) can be combined, e.g. in order to minimize the risk of disconnection of a portable electronic device which application is still configuring the portable electronic device. Different inputs (delay, power consumption, notification . . . ) can give conflicting information. It is possible to define a precedence between those inputs, and the precedence may depend on the situation, for example power consumption may have precedence over delays with certain portable electronic devices, but not with others. There can be two delays. One after which the application is normally expected to be finished, and another one after which it is not possible for the application to not have finished or crashed. Therefore if the first delay has elapse but power is still consumed significantly, it is possible to wait until the second delay expires (considering that power consumption can be normal, as the application can have been a bit slower than expected). But once the second delay is reached, it can be considered that the application must have crashed. The use of delays is particularly useful with the embodiment in which measurement of only the overall power consumption is done, in order to make sure that even if one chip fails, the whole batch is not blocked until an operator comes and manually manages the situation, but only until the timer's delay expires.

In preferred embodiments, the manufacturing equipment comprises more than a hundred electric output means (M_VCC, M_GND), in order to be able to self-configure many portable electronic devices in parallel. This embodiment is mostly applicable to contact mode, since if the manufacturing equipment operates in contact-less mode, it is typically possible to use a single antenna of the manufacturing equipment to supply power to many portable electronic contact-less devices. According to a preferred embodiment, the manufacturing equipment works in contact mode and comprises a certain number N_H of heads able to communicate with a portable electronic device (for example 32 or 64 heads), and another number N_O of electric output means (for example more than 100) able to supply electric power to a portable electronic device. The manufacturing equipment can be set to manage N_O plus N_H portable electronic devices simultaneously, by communicating with up to N_H devices in parallel while at the same time up to N_O devices are self configuring themselves. If the manufacturing equipment is expected to configure a single type of portable electronic devices, the numbers N_O and N_H can be adjusted in order to be optimal for such portable electronic device. For example, if the manufacturing equipment is used to configure electronic ID cards, and if it is determined that 7% of the configuration time of the electronic ID card requires communications with a personalization machine while 93% of the configuration time is spent on generating an RSA key pair, then the manufacturing equipment can have 64 heads and 850 electric output means (93*64/7), so that the throughput of the manufacturing equipment be the same as a regular personalization machine with 64 heads on which no key pair is generated (it's as if the key pair generation became instantaneous). It is possible to have a system comprising two separate machines, e.g. a regular personalization machine with 64 heads and a distinct basic manufacturing equipment with 850 electric output means for providing electric power to the portable electronic devices but no personalization capability (no way to send data to the portable electronic device). On the one hand, it may be advantageous to put everything in a single manufacturing equipment in order to be able to more easily alternate both procedures, for example to communicate with a portable electronic device, then to let it configure itself, and then possibly again communicate with it, and so on. On the other hand having two separate machines avoids having to redesign a new complex machine such as a personalization machine, which can be off-the-shelf. A basic manufacturing equipment to merely supply electric power can then be provided separately, and is much simpler, especially for contact-less devices.

In a possible embodiment of manufacturing equipment according to the invention, the manufacturing equipment of the invention is therefore split in two sub equipments and consists of a system comprising
- a known manufacturing equipment (such as personalization machines) for configuring portable electronic devices, and
- a separate basic manufacturing equipment able to supply power to many portable electronic devices and equipped with determination means as described above, but not comprising the features necessary to configure a portable electronic device (i.e. send commands, write in its non volatile memory, etc.)

The invention also relates to a method for configuring a portable electronic device as described above comprising:
- presenting the portable electronic device to a manufacturing equipment as describe above in order to receive electric power from the manufacturing equipment through electric input means,
- letting the application in the portable electronic device start automatically and configure the portable electronic device The preferred embodiments and variants described above in relation to any one of the three following objects/methods: {portable electronic device, manufacturing equipment for configuring a portable electronic device, method for configuring a portable electronic device} can apply equally to the other two objects/methods.

The invention claimed is:

1. A portable electronic device comprising:
   a. electric input means for receiving electric power from a manufacturing equipment,
   b. an application loaded into the portable electronic device, by using a personalization machine during a post-manufacturing personalization phase in which the portable electronic device is configured for a specific entity, the application being stored in a memory of the portable electronic device, the application set i. to be triggered when power is supplied to said electric input means by the manufacturing equipment, and ii. to communicate solely with entities internal to the portable electronic device during a personalization phase of the portable electronic device, wherein the application is further set iii. to configure the portable electronic device during the personalization phase of the portable electronic device when said application is triggered, and iv. to be successfully executable not more than one time, said one time occurring during the personalization phase of the portable electronic device.

2. The portable electronic device according to claim 1, comprising means to detect situations in which the application fails or is interrupted before completion, and to resume or restart the application next time power is supplied to said electric input means.

3. The portable electronic device according to claim 1, comprising means to detect the successful execution of the application, the portable electronic device being set to remove the application from the memory of the portable electronic device after successful execution is detected.

4. The portable electronic device according to claim 1, wherein the portable electronic device is a smart card, a memory card, a USB token, an electronic passport, or an electronic driver's license.

5. The portable electronic device according to claim 1, the portable electronic device comprising non-volatile memory, wherein configuring the portable electronic device comprises generating an asymmetric cryptography key pair and storing at least the private key of the key pair in said non volatile memory.

6. The portable electronic device according to claim 1, the portable electronic device comprising flash memory, wherein configuring the portable device comprises testing the flash memory.

7. Manufacturing equipment for configuring a set of portable electronic devices having
   a. electric input means for receiving electric power from the manufacturing equipment,
   b. an application loaded into at least one of the portable electronic devices by using a personalization machine during a post-manufacturing personalization phase in which the portable electronic device is configured for a specific entity and stored in a memory of the at least one portable electronic device, said application being set
      i. to be triggered when power is supplied to said electric input means by the manufacturing equipment, and
      ii. to communicate solely with entities internal to the portable electronic device during a personalization phase, wherein the application is further set
      iii. to configure the portable electronic device during the personalization phase of the at least one portable electronic device, and iv. to be successfully executable not more than one time, said one time occurring during the personalization phase of the portable electronic device, the manufacturing equipment comprising electric output means designed to supply electric power to electric input means of portable electronic devices, the manufacturing equipment comprising determination means for determining, without communicating with said portable electronic device powered through said electric output means, the completion of the execution of the application of said portable electronic device.

8. The manufacturing equipment according to claim 7, wherein the electric output means comprise an antenna for providing power to contact-less portable electronic devices.

9. The manufacturing equipment according to claim 7, wherein the electric output means comprise electric contacts for connecting to the portable electronic devices.

10. The manufacturing equipment according to claim 9, wherein one set of electric contacts of the electric output means is set to power several portable electronic devices.

11. The manufacturing equipment according to claim 9, wherein each set of electric contacts of the electric output means is set to power a corresponding portable electronic device.

12. The manufacturing equipment according to claim 7, wherein the determination means comprise means for measuring the electric power supplied to the portable electronic device through the electric output means.

13. The manufacturing equipment according to claim 7, wherein the determination means comprise a timer measuring the longest possible time for the execution of the application.

14. The manufacturing equipment according to claim 7, wherein the manufacturing equipment comprises more than a hundred electric output means.

15. A method for configuring a portable electronic device having electric input means for receiving electric power from a manufacturing equipment, the method comprising: loading an application into the portable electronic device by a personalization machine during a post-manufacturing personalization phase in which the portable electronic device is configured for a specific entity and storing the application in a memory of the portable electronic device, said application being set i. to be triggered when power is supplied to said electric input means by said manufacturing equipment, and ii. to communicate solely with entities internal to the portable electronic device during a personalization phase of the portable electronic device, wherein the application is further set iii. to configure the portable electronic device during the personalization phase, and iv. to be successfully executable not more than one time, said one time occurring during the personalization phase of the portable electronic device; presenting the portable electronic device to the manufacturing equipment having electric output means designed to supply electric power to electric input means of portable electronic devices, the manufacturing equipment comprising determination means for determining, without communicating with said portable electronic device powered through said electric output means, the completion of the execution of the application of said portable electronic device in order to receive electric power from the manufacturing equipment through electric input means, II letting the application in the portable electronic device start automatically and configure the portable electronic device.

16. A method for configuring a chip of a portable electronic device (SC, TK) during a manufacturing phase of said chip, the method comprising the following step:
 a. connecting electric input means (VCC, GND, ANT) of the chip of the portable electronic device (SC, TK) to electric output means (M_VCC, M_GND) of the manufacturing equipment in order to receive electric power from the manufacturing equipment,
 b. operating an application stored in a memory of the portable electronic device,
  i. to be triggered automatically when power is supplied to said electric input means (VCC, GND, ANT) by the electric output means (M_VCC, M_GND) of the manufacturing equipment, and
  ii. to not communicate with entities external to the portable electronic device (SC, TK) during a configuration procedure of said portable electronic device during a personalization phase,
wherein the application is further set
 c. to automatically configure the chip of the portable electronic device (SC, TK) during the manufacturing phase of said portable electronic device when said application is triggered, and
 d. to be successfully executable at most once.

17. The method for configuring a chip of a portable electronic device during a manufacturing phase of said chip of claim 16, wherein once the configuration procedure is ended and the application has successfully executed, operating the application to trigger notification means of the portable electronic device to notifying to an external entity.

18. The method for configuring a chip of a portable electronic device during a manufacturing phase of said chip of claim 17, wherein operating determination means of the manufacturing equipment to receive the notification sent by the notification means of the portable electronic devices (SC, TK) powered through said electric output means (M_VCC, M_GND), that the execution of the application of said portable electronic device (SC, TK) is finished.

19. The method for configuring a chip of a portable electronic device during a manufacturing phase of said chip according to claim 16, wherein operating detection means of the portable electronic device to detect situations in which the application fails or is interrupted before completion, and to resume or restart the application next time power is supplied to said electric input means.

20. The method for configuring a chip of a portable electronic device during a manufacturing phase of said chip according to claim 16, wherein operating detection means of the portable electronic device to detect the successful execution of the application, and operating the portable electronic device to remove the application from its memory after successful execution is detected.

21. The method for configuring a chip of a portable electronic device during a manufacturing phase of said chip according to claim 16, wherein configuring the chip of the portable electronic device comprises generating an asymmetric cryptography key pair and storing at least the private key of the key pair in a non-volatile memory in the portable electronic device.

22. The method for configuring a chip of a portable electronic device during a manufacturing phase of said chip according to claim 16, wherein configuring the chip of the portable electronic device comprises testing a flash memory of the portable electronic device.

23. The method for configuring a chip of a portable electronic device during a manufacturing phase of said chip according to claim 16, wherein operating determination means of the manufacturing equipment for determining, without communicating with said portable electronic device powered through said electric output means (M_VCC, M_GND), that the execution of the application of said portable electronic device is finished.

24. The method for configuring a chip of a portable electronic device during a manufacturing phase of said chip according to claim 23, wherein the determination that the execution of the application of said portable electronic device is finished comprises the step of measuring the electric power supplied to the portable electronic device (SC, TK) through the electric output means.

25. The method for configuring a chip of a portable electronic device during a manufacturing phase of said chip according to the claim 22, wherein the determination that the execution of the application of said portable electronic device is finished comprises the step of measuring the longest possible time for the execution of the application.

* * * * *